US012570027B2

(12) United States Patent
Kirkpatrick

(10) Patent No.: US 12,570,027 B2
(45) Date of Patent: Mar. 10, 2026

(54) PROCESS TO MANUFACTURE A DISCREET ORIFICE AIR BEARING

(71) Applicant: Christopher Kirkpatrick, Bridgewater, NJ (US)

(72) Inventor: Christopher Kirkpatrick, Bridgewater, NJ (US)

( * ) Notice: Subject to any disclaimer, the term of this patent is extended or adjusted under 35 U.S.C. 154(b) by 85 days.

(21) Appl. No.: 18/677,079

(22) Filed: May 29, 2024

(65) Prior Publication Data

US 2024/0399629 A1      Dec. 5, 2024

Related U.S. Application Data

(60) Provisional application No. 63/470,421, filed on Jun. 1, 2023.

(51) Int. Cl.
| | |
|---|---|
| *B29C 39/10* | (2006.01) |
| *B29C 39/00* | (2006.01) |
| *B29K 63/00* | (2006.01) |
| *B29L 31/04* | (2006.01) |
| *F16C 32/06* | (2006.01) |

(52) U.S. Cl.
CPC ............ *B29C 39/10* (2013.01); *B29C 39/003* (2013.01); *B29K 2063/00* (2013.01); *B29L 2031/04* (2013.01); *F16C 32/0622* (2013.01); *F16C 2220/02* (2013.01)

(58) Field of Classification Search
CPC .......................... F16C 32/0614; F16C 33/1005
See application file for complete search history.

(56) References Cited

U.S. PATENT DOCUMENTS

| | | | | |
|---|---|---|---|---|
| 3,751,271 A | * | 8/1973 | Kimura ............. | B01D 39/2034 |
| | | | | 428/596 |
| 4,909,300 A | * | 3/1990 | Horie ..................... | C04B 41/88 |
| | | | | 164/97 |

(Continued)

FOREIGN PATENT DOCUMENTS

| | | | | |
|---|---|---|---|---|
| CN | 109719295 A | * | 5/2019 | |
| JP | H1088416 A | * | 4/1998 | |

OTHER PUBLICATIONS

Translation of CN-109719295-A (Year: 2019).*

*Primary Examiner* — Jacob J Cigna

(74) *Attorney, Agent, or Firm* — My Patent Guys; Christopher Pilling

(57) ABSTRACT

The present invention provides a method for manufacturing an air bearing with discreet orifices designed to facilitate a non-contact interface between surfaces. The process involves using a mold wherein wires or filaments are placed to form air channels within a cast. Various materials, such as silicone, steel, and composites, can be used for the mold. After casting and curing the material, the wires are removed, leaving precisely defined channels that allow air to flow through, creating a cushion of air that maintains a gap between the bearing and the surface it operates on. This gap can be adjusted by changing the air pressure or the number of channels. The bearing components may be further machined or secured in a housing connected to an air source, enabling the bearing to hover and operate efficiently in various applications. The invention allows for multiple configurations of the air channels to optimize airflow distribution as required.

8 Claims, 6 Drawing Sheets

(56) References Cited

U.S. PATENT DOCUMENTS

|  |  |  |  |  |
|---|---|---|---|---|
| 8,858,864 | B2 * | 10/2014 | Okesaku | ............... C04B 35/185 |
|  |  |  |  | 264/634 |
| 11,534,826 | B2 * | 12/2022 | Okamoto | ............... B33Y 80/00 |
| 2003/0235272 | A1 * | 12/2003 | Appleby | ............... B29C 39/021 |
|  |  |  |  | 378/147 |

* cited by examiner

101

103

102

101

102

103

200

103

600

602

603

601

PROCESS TO MANUFACTURE A DISCREET ORIFICE AIR BEARING

CROSS-REFERENCE TO RELATED APPLICATIONS

The present invention claims priority to Provisional U.S. Utility Patent Application Ser. No. 63/470,421, filed Jun. 1, 2023, entitled "Process To Manufacture An Air Bearing" which is hereby incorporated in its entirety at least by reference.

BACKGROUND OF THE INVENTION

1. Field of the Invention

The present invention relates to aerostatic air bearings but more particularly to a process to manufacture a discreet orifice air bearing.

2. Description of Related Art

Air bearings are integral to industries requiring high precision and low friction motion, such as aerospace, semiconductor manufacturing, metrology, material handling, and precision machinery. Traditional air bearings use a thin film of pressurized air to provide low-friction, non-contact, and high-precision motion between surfaces, categorized into aerodynamic and aerostatic types based on their air film generation method. While effective, conventional manufacturing methods for air bearings, including machining, grinding, lapping, and polishing, present several challenges. These methods require the maintenance of extremely small gaps and precise geometries, necessitating advanced and costly equipment and environments. Additionally, traditional materials like graphite, metals, and ceramics impose design limitations. Consequently, a solution is needed.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An object of the present invention is to introduce a manufacturing process for air bearings that addresses the limitations of traditional techniques while significantly enhancing the efficiency, reliability, and versatility of air bearing systems. At the core of this invention is the use of wires or filaments, either individually or in an array pattern, embedded within a composite of thermoset or thermoplastic materials. After the composite has cured and solidified, these wires or filaments are removed, leaving precisely defined channels that facilitate the controlled flow of a fluid medium, such as gas in aerostatic air bearings or liquids in hydrostatic bearings.

This process allows for the use of thermoset composites and engineered air ducts or orifices, ensuring consistent and controlled airflow through these channels. By enabling the strategic placement and patterning of these channels, the invention allows for complex geometrical designs that were difficult to achieve with older methods. Overall, this approach not only overcomes previous manufacturing challenges but also reduces production costs and improves manufacturing efficiency, providing substantial advancements over traditional air bearing fabrication techniques.

The present invention describes several embodiments of a process for manufacturing air bearings, specifically discrete orifice air bearings. In some embodiments, this process includes using a mold where fine wire filaments are positioned in a predetermined pattern and perpendicular to the bottom surface of the mold. These filaments are intended to define the channels for fluid flow, such as air or liquid, to facilitate the creation of a bearing surface.

In one embodiment, the process begins with placing the filaments through the bottom surface of the mold. A casting material, which may be a non-porous thermoset or thermoplastic composite, is then poured around these filaments within the mold. Following the curing and hardening of the casting material, the filaments are extracted, resulting in precisely formed channels. These channels enable a consistent and controlled flow of fluid across the bearing's surface.

Additional steps may involve machining the cured cast to specific dimensions and housing the cast within a structure that includes an inlet for fluid connection. This approach to creating air bearings aims to reduce production costs and manufacturing complexity while increasing flexibility and precision in discreet air bearing design, addressing several limitations of traditional bearing manufacturing methods. The process is adaptable to various mold configurations and wire arrangements, such that specific airflow patterns within the air bearing may be provided.

The foregoing has outlined rather broadly the more pertinent and important features of the present disclosure so that the detailed description of the invention that follows may be better understood and so that the present contribution to the art can be more fully appreciated. Additional features of the invention, which will be described hereinafter, form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a process to manufacture a discreet orifice air bearing.

It is to be understood that the terminology used herein is for the purpose of describing particular embodiments only and is not intended to be limiting. The terms "a" or "an," as used herein, are defined as to mean "at least one." The term "plurality," as used herein, is defined as two or more. The term "another," as used herein, is defined as at least a second or more. The terms "including" and/or "having" as used herein, are defined as comprising (i.e., open language). The term "providing" is defined herein in its broadest sense, e.g., bringing/coming into physical existence, making available, and/or supplying to someone or something, in whole or in multiple parts at once or over a period of time. These terms generally refer to a range of numbers that one of skill in the art would consider equivalent to the recited values (i.e., having the same function or result). In many instances these terms may include numbers that are rounded to the nearest significant figure. The term "discreet orifice air bearing" refers to a type of air bearing where the bearing material itself is non-porous. In this bearing, fluid is conveyed through specifically designed, discrete air channels within the bearing structure. These channels, rather than the material of the bearing, facilitate the operational medium, allowing the bearing to function. Thus, in the detailed description provided below, the bearing material must be non-porous.

Figure 1:
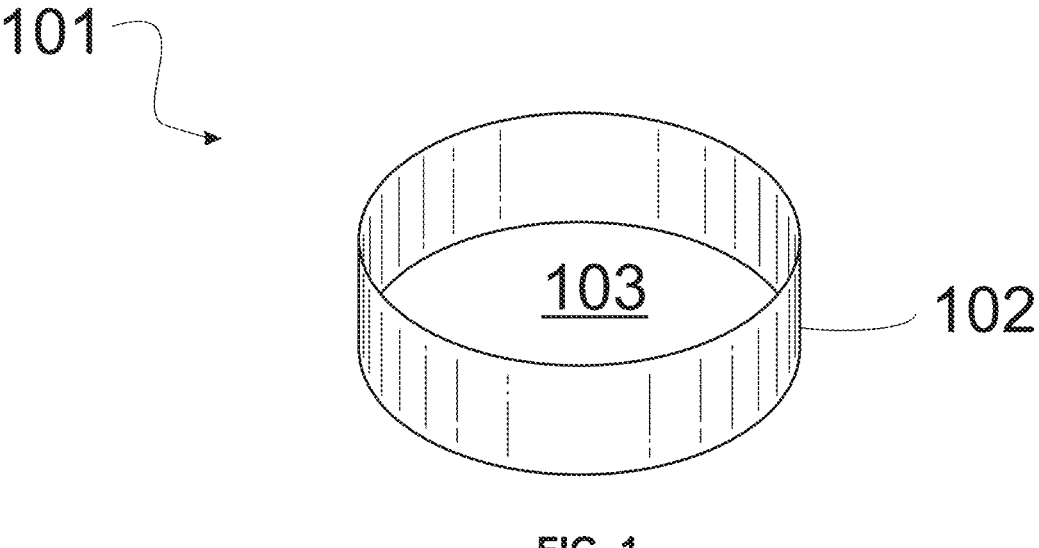
FIG. 1 is a perspective view of a molding element according to an embodiment of the present invention.
Figure 2:
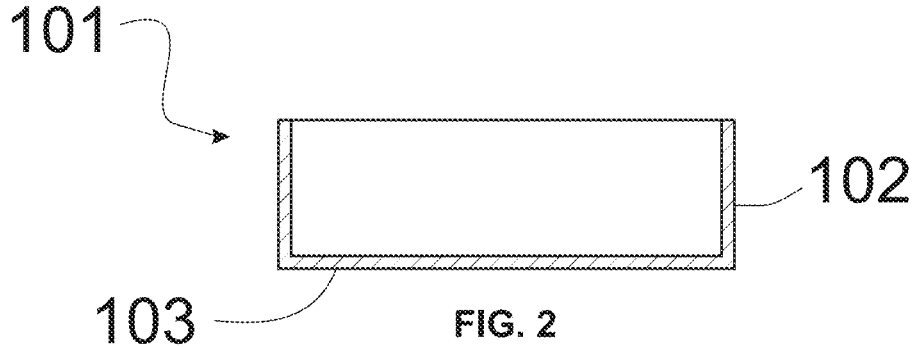
FIG. 2 is a sectional front view of FIG. 1.

FIGS. 1-6 illustrate process steps to manufacture a discreet air bearing. Referring now to FIGS. 1-2, a molding element 101 is illustrated. First, in one embodiment, an open cylindrical silicone mold is provided, having a round sidewall 102, bottom surface 103, and an open top providing a hollow interior. Although silicone is provided in one embodiment, it is understood that other materials may be used including, but not limited to, steel, wood, laminates, glass, plexiglass, or plastics. Further, multiple materials may be used, including the use of coatings, to promote release of the resin which will be discussed in further details below.

Figure 3:
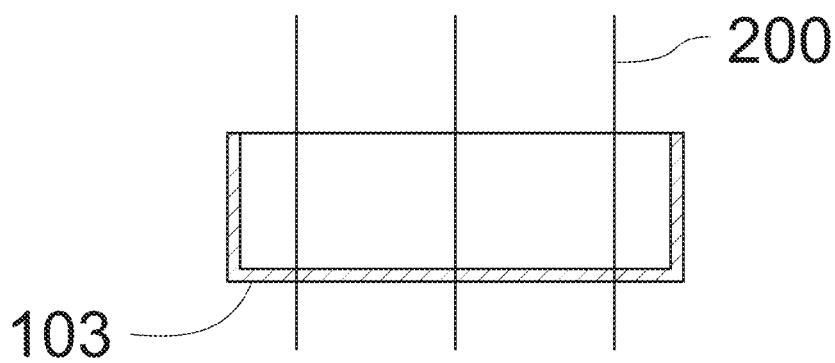
FIG. 3 is a sectional front view of the molding element with wire filaments installed according to the embodiment of the present invention.

Referring now to FIG. 3, next, in one embodiment, a needle is threaded with fine wire, wherein the wire 200 is threaded through the bottom surface 103 of the mold in a vertical configuration as illustrated. The plurality of wires 200 may be positioned at any desirable location throughout the bottom surface 103 within the mold as desired. It should be understood that other methods of positioning the plurality of wires 200 through the bottom surface 103 may be utilized, wherein the critical aspect is to utilize the wires to create channels within the casted mold as discussed below.

Figure 4:
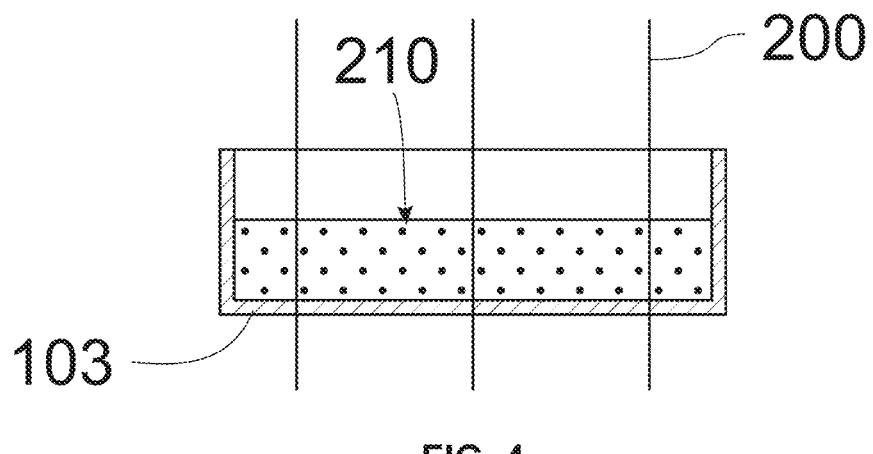
FIG. 4 is a sectional front view of the molding element with wire filaments and a composite epoxy added according to an embodiment of the present invention.
Figure 5:
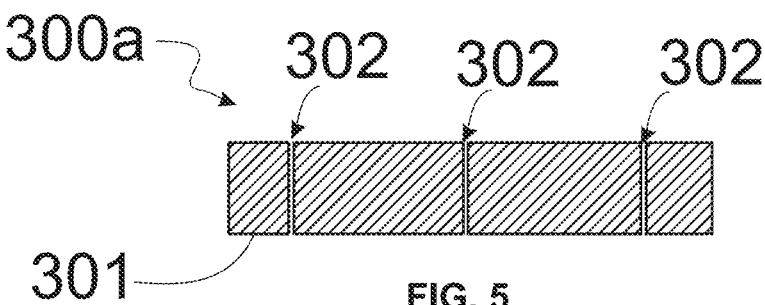
FIG. 5 is a sectional front view of the cast after removal of the wire filament according to an embodiment of the present invention.

Referring now to FIG. 4, next, in one embodiment, a composite epoxy system 210 is introduced and poured into the mold and allowed to cure for a predetermined time as well known in the art. Best seen in FIG. 5, once cured, a cast 300*a* is created, and after demolding from the molding element 101, including the removal of the plurality of wires 200, a plurality of air channels 302 are created within the body 301 of the cast. As previously discussed, the material selection of the molding element 101 may aid in the demolding process.

Figure 6:
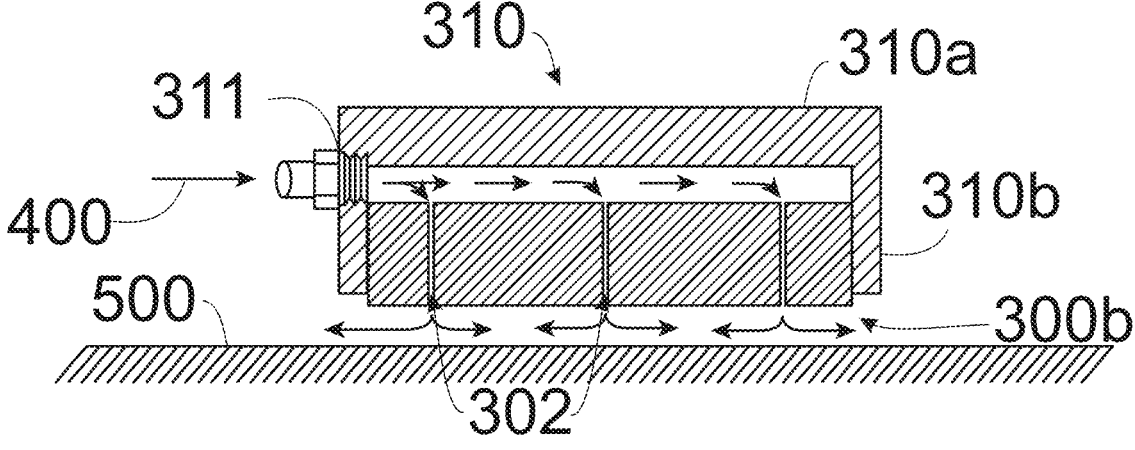
FIG. 6 is a sectional front view of the discreet orifice air bearing ready for use according to an embodiment of the present invention.

Finally, as seen in FIG. 6, the cast 300*b* may be machined, trimmed, or cut to a desired size and secured within a housing 310. In one embodiment, the housing comprises a top surface 310*a*, and a cylindrical sidewall 310*b*. In a portion of the cylindrical sidewall 310*b* an orifice 311 is provided, wherein the orifice 311 is configured to accommodate an external air source (not illustrated). The discreet orifice air bearing is now ready for use, wherein air 400 provided from the external air source is designed to be distributed through the housing such that the air travels within the plurality of air channels 302 providing a fly-height or gap between the bearing's bottom surface 303 and the relative bearing surface 500. The gap may be adjusted by the air pressure of the external air source or by increasing or decreasing the number of channels.

Although air channels have been described above, the channels may be used for any fluid, such as a gas or liquid, wherein the external source provides the desired fluid. Any fluids may be used, including but not limited to, compressed air, nitrogen, water, oil, and similar fluids. In some embodiments, wire-like substitutes, such as filaments and synthetic or natural fibers may be used.

Figure 7:
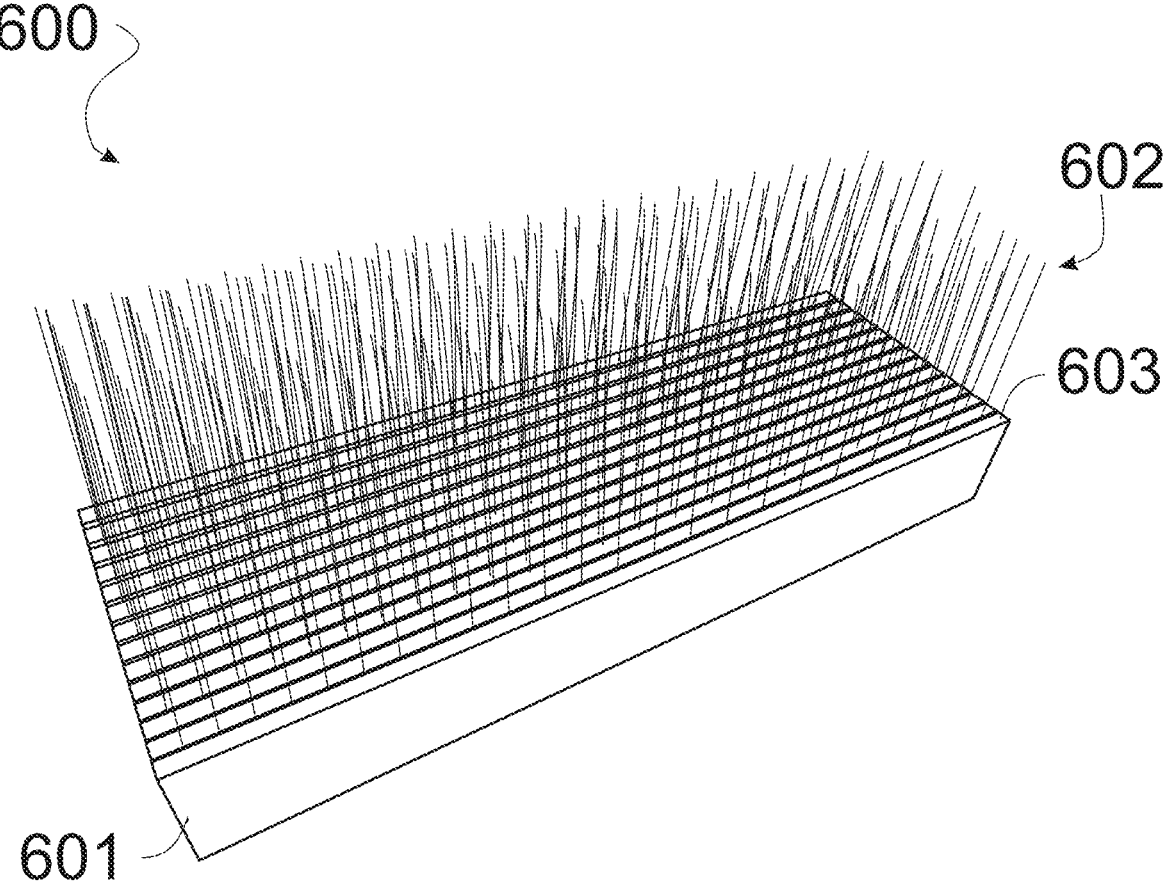
FIG. 7 is a perspective view of an alternative molding setup used in the process of manufacturing a discreet orifice air bearing, showing the initial arrangement of cut material elements and positioning of wires, according to an embodiment of the present invention.

Referring now to FIG. 7, an additional process to manufacture a discreet air bearing is illustrated. First, a plurality of material elements 601 are cut to a desired length, width, and height. In one embodiment, the plurality of material elements are cut to 7" in length, 0.125" in width, and 0.250" in height, however it is understood that the dimensions may vary. The material elements may be any suitable material. Next, an adhesive is applied to at least one side lengthwise to a material element. In one embodiment, the adhesive is an acrylic contact adhesive, such as contact cement, however other adhesives may be used. Next, a plurality of wires or filaments 602 are positioned between the adjacent material elements 601. The wires 602 are held in position by the adhesive, and should be positioned such that one end extends perpendicular to the top surface 603 of the element. In some embodiments, each wire should be positioned at a consistent distance from the next wire, such as every 0.25". In alternative embodiments, each wire may be positioned at any distance or pattern. Next, an adjacent material element is positioned, such that the wires 602 are sandwiched between two adjacent elements. Adhesive may be applied to the adjacent element. This is repeated as desired and the plurality of material elements 601 creates a parallel stack with a plurality of wires positioned between adjacent elements as illustrated. Advantageously, when the adhesive cures it will create a section of a mold for casting which will be discussed in further details below.

Next, the parallel stack is secured together with a suitable method, such as clamps, adhesive, etc. In some embodiments, the perimeter of the parallel stack assembly is wrapped or surrounded by segments of material such that a frame is created around the assembly. In one embodiment, acrylic sheets may be used. In other embodiments, tape may be used to create the vertical walls of the mold. Next, a suitable composite material is poured into the mold cavity. Once cured, the assembly is disassembled, the wires are removed and a cast is created with air channels, similarly to the first embodiment discussed above. Next, the cast may be machined, planed, polished, etc. according to any desired size and finish specifications. Finally, the finished cast may be secured in a housing, connected to an air source, and used in a desired manner. The housing provides the chamber creating the pressure differential to force airflow through the casted channels enabling the bearing to hover, such that a gap is created between bearing surfaces, providing a non-contact interface as well known in the art. This gap may be adjusted depending on the use and requirements.

It should be appreciated that several other similar processes may be realized having similar steps as described, for example, an additional process to manufacture a discreet air bearing is now described below. First, a cylindrical mold is prepared similar to the first embodiment. In one embodiment, the cylindrical mold has a diameter of 2" and a height or depth of 1". For this height, multiple segments of 0.25" diameter carbon fiber rod or tube, each 1.75-2" in length, are cut for the purpose of being vertically positioned within the mold. It should be understood that the cylindrical mold size may vary, which would require a modification of the rods. Next, a plate having a hexagonal array of oversized 0.25" holes is created. In one embodiment, the plate is 0.25" in height. The plate is designed to sit atop the edges of the mold, allowing for the carbon fiber rods to fit through the holes and be positioned vertically within the mold. Next, thin wires are attached to the 0.25" diameter rods. The wire is oriented parallel to the rod, wraps around one end, and both ends of the wire overhang the opposite end of the rod. Narrow tape or other adhesives is used to secure the wire to the rods. Next, a composite material is prepared and poured inside the mold up to a desired level. Following this, the hexagonal-patterned plate is positioned over the top of the mold. Next, the rods are inserted through the holes in the hexagonal patterned overlay plate and down into the composite material within the mold. The rods are oriented such that the wires are positioned relative to the adjacent rods, with the exposed ends of the wire facing up, outside the mold. After the composite system cures, the casting is demolded. The bottom side of the casting is then fly-cut, sanded, or ground as desired to expose the now encapsulated wires. Next, the wires are extracted from the top of the casting, using any suitable method, such as pliers or a similar tool. This creates the air channels within the cast material. Finally, the finished cast is secured in a housing which is configured to provide a connection to an air source as previously discussed. The housing creates a chamber that generates a pressure differential, forcing airflow through the cast channels to enable the bearing to hover in a non-contact manner, as described previously.

Any of the methods described herein enable a specific arrangement of air channels within the bearing, and advantageously the use of wires enable very small diameter air channels to be made. The specific arrangement is critical for the engineer or designer to strategically concentrate or distribute the air flow as desired for the intended implementation of the discreet air bearing.

As the use of wires or filaments are used to form defined air channels within the bearing, other embodiments, implementations, and variations may be appreciated. In one embodiment, the body of a bearing is either cast with strategically placed, oversized holes to accommodate the placement of wires, threads, or filaments. In other embodiments, the body may be 3D printed. Once these materials are positioned, a small amount of a resin system, such as a filled epoxy, is deposited into the cavities containing the wire or filament. After the resin cures, the wire or filament is extracted, leaving behind precisely defined channels for airflow.

In another embodiment, hexagonal blanks are configured to be cast with a wire or filament passing through their centerline. A number of hexagonal blanks may be bonded together to create an array. Once the assembly is complete, the wires or filaments are removed to form channels, providing a modular approach to constructing airflow systems within composite structures.

In yet another embodiment, threaded rods, inserts, bolts, or similar elements may be cast from composite materials, such as thermoset or thermoplastic, with wires or filaments positioned along the centerline or arrayed around the centerline. These components are designed to be secured within mating threaded ports, which then facilitate the desired airflow. This method utilizes an array of threaded holes populated with these specially cast parts to form an array of air channels.

In another embodiment, within a cylindrical mold wires are configured to be arranged in a hub-and-spoke pattern. This process involves lacing wires through or around inserts positioned along the inner diameter surface of the cylindrical mold, which is then rotated along its axis to evenly distribute casting material. This rotational molding technique creates radial pathways for air, lubricants, or other fluids to flow through the finished part, utilizing high pressures to achieve detailed flow paths often unattainable through standard casting methods.

Although the use of wires or filaments has been discussed as the preferred element to cast the air channels, in an alternative embodiment, thread or long fiber, such as Polyvinyl Alcohol (PVA), which is cast within a thermoset epoxy system may be used. PVA is advantageous due to its water-soluble properties, allowing it to be removed by simple exposure to water, leaving behind a narrow air channel. This technique can also be applied using a woven textile of PVA threads or fibers, similar to the handling of fiberglass cloth in resin systems. After the resin cures, the exposed PVA can be dissolved with water, effectively forming air channels within the epoxy matrix, providing an alternative method for creating intricate internal air channels within composite materials.

Figure 8:
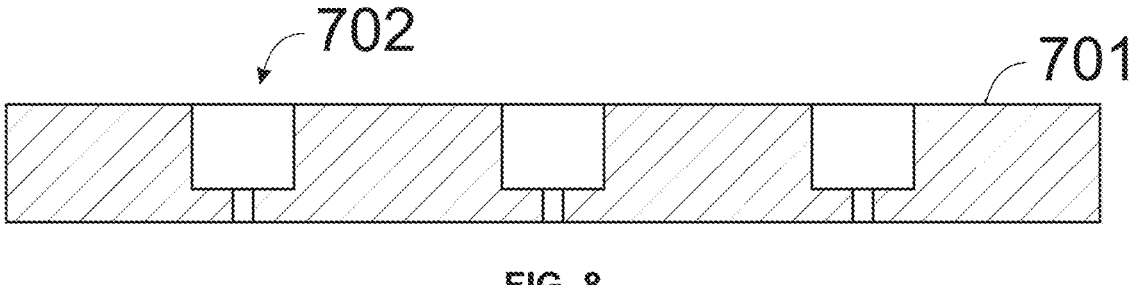
FIG. 8 is a section front view of a bearing base according to an embodiment of the present invention.

Referring now to FIGS. 8-12, an additional process to manufacture a discreet air bearing is illustrated. In FIG. 8, a bearing base structure 701 is provided. In some embodiments, the bearing base structure 701 is 3D printed. In other embodiments, the bearing base structure may be machined or cast from any desirable material. The material selection of the bearing base may vary depending on the desired properties of the material as well known in the art, however it is critical a non-porous material is used, including, but not limited to, non-porous graphite, steel, brass, glass, nickel, ceramics, non-porous carbon, granite, iron-nickel alloys, machinable glass-ceramics, non-porous thermoplastics, and similar non-porous materials. In one embodiment, the bearing base structure 701 is provided with a plurality of countersunk through-holes 702.

Figure 9:
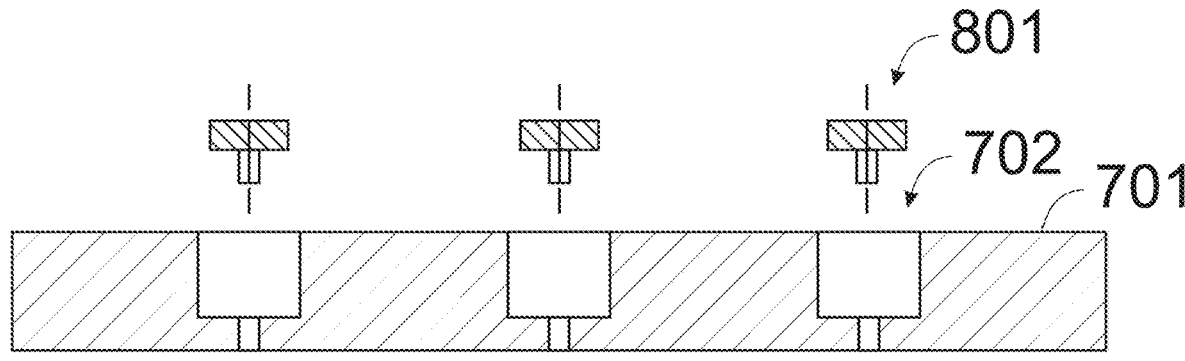
FIG. 9 is a section view of the bearing base and 3D printed inserts prior to being positioned within the bearing base according to an embodiment of the present invention.
Figure 10:
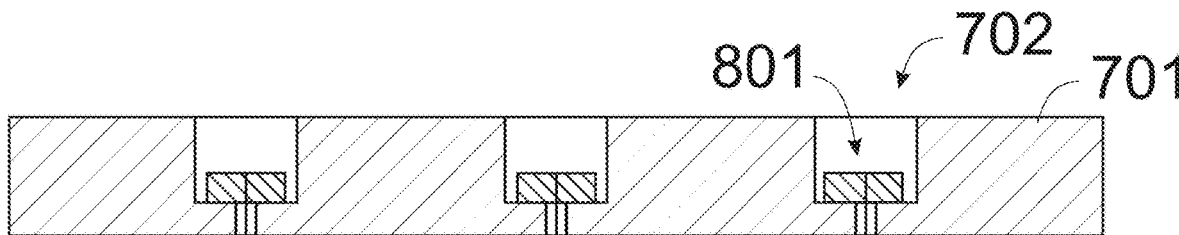
FIG. 10 is a section view of the bearing base with the 3D printed inserts being positioned within the bearing base according to an embodiment of the present invention.
Figure 11:
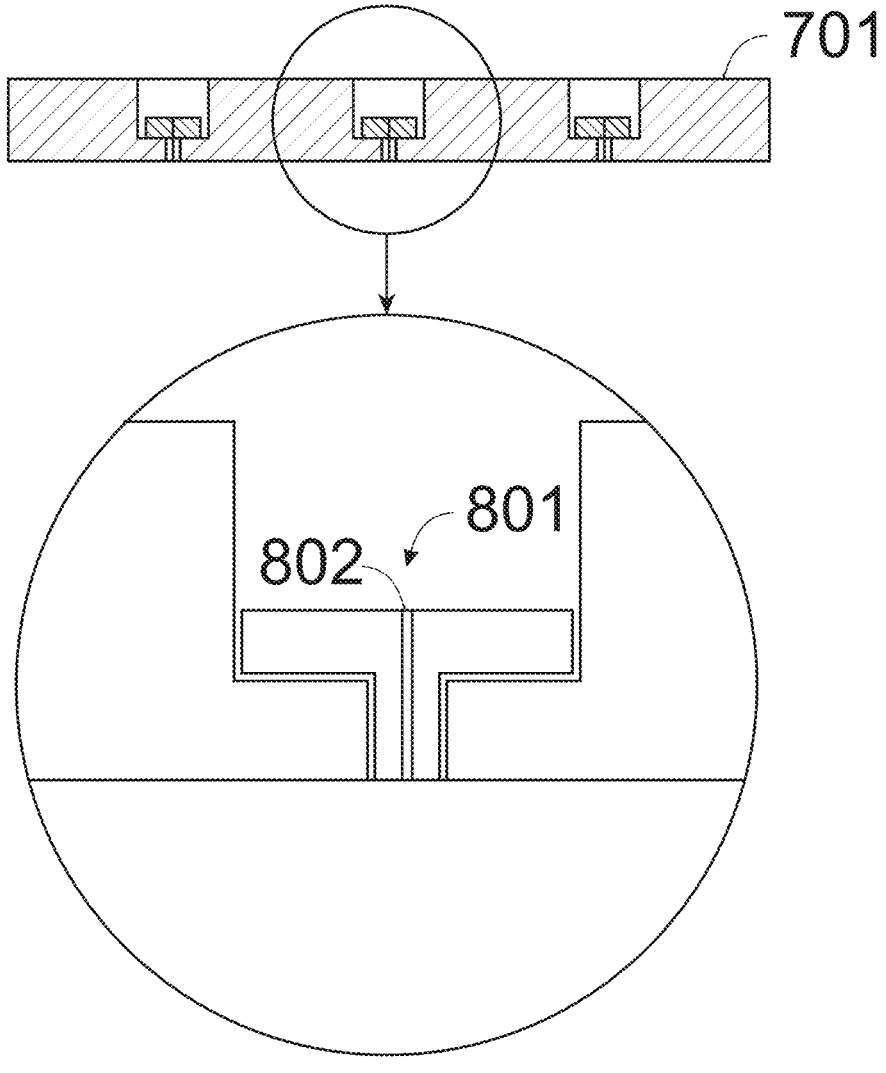
FIG. 11 is a detailed view of FIG. 10.
Figure 12:
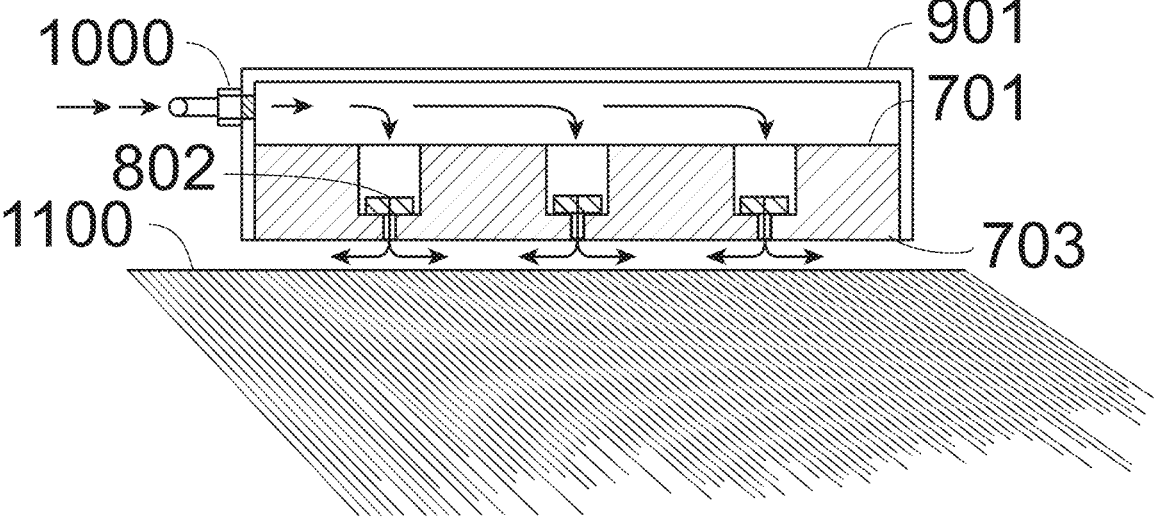
FIG. 12 is sectional front view of the discreet orifice air bearing ready for use according to an embodiment of the present invention.

Next, as seen in FIGS. 9-11, a plurality of inserts 801 are oriented and positioned within the plurality of countersunk through-holes 702. In one embodiment, the plurality of inserts 801 are 3D printed. Advantageously, each insert 801 includes a small channel or orifice 802. In some embodiments, each insert 801 is secured within the bearing body via adhesive. In other embodiments, a friction fit or interference fit may be used. Finally, as seen in FIG. 12, the bearing base 701 is configured to be positioned within a housing 901 creating a discreet orifice air bearing ready for use. The bearing having a fluid inlet 1000 connected to an external fluid source, wherein the fluid such as air is designed to be distributed through the housing such that the fluid travels within the orifices 802 providing a fly height or gap between the bearing's bottom surface 703 and the relative bearing surface 1100.

If the bearing base is casted, it is desirable to seal each end of the inserts 801 during processing to avoid damage and to keep the orifices clear. In one embodiment, the inserts may be positioned within a mold using a tool to hold the ends of the insert in position shielding the entrance and exit points of the orifices from being exposed. Next, the composite epoxy can be poured into the mold which will surround the inserts creating a bond to the vertical surfaces of inserts, leaving the ends shielding so the air channels or orifices are intact after curing. In other embodiments, the inserts may be 3D printed with a removable end positioned on the top and bottom surface of the inserts, configured to be removed after casting such that the channels or orifices are intact after processing.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention.

It should further be noted that throughout the entire disclosure, the labels such as left, right, front, back, top, bottom, forward, reverse, clockwise, counterclockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, references to "first," "second," "third," and etc. members throughout the disclosure (and in particular, claims) are not used to show a serial or numerical limitation but instead are used to distinguish or identify the various members of the group.

What is claimed is:

1. A process to manufacture a discreet orifice air bearing, comprising steps:
   (a) providing a mold, the mold having a bottom surface, at least one side wall, and an open top providing a hollow interior volume;
   (b) positioning a plurality of filaments through the bottom surface of the mold in a predetermined pattern, each filament being perpendicular to the bottom surface, wherein the position of each filament defines a channel and the plurality of filaments are each threaded to a needle to pierce through the bottom surface of the mold;
   (c) pouring a casting material within the hollow interior volume around the plurality of filaments;
   (d) allowing the casting material to cure and harden; and,
   (e) demolding the cured cast from the mold and removing the plurality of filaments to create a plurality of channels within the cured cast, wherein the plurality of channels are configured to distribute fluid to create a bearing surface when in communication with an fluid source.

2. The process of claim 1, wherein the plurality of filaments is a plurality of wire.

3. The process of claim 1, wherein the plurality of filaments are made from metal, synthetic fibers, and natural fibers.

4. The process of claim 1, wherein the fluid is a gas or liquid.

5. The process of claim 1, wherein the casting material is non-porous.

6. The process of claim 1, wherein the mold is constructed from silicone.

7. The process of claim 1, further comprising step (f) machining the cured cast to a desired size.

8. The process of claim 7, further comprising step (g) securing the cured cast within a housing, wherein the housing includes an inlet for connection to the fluid source.

* * * * *